United States Patent [19]

Miyakawa et al.

[11] Patent Number: 4,844,037
[45] Date of Patent: Jul. 4, 1989

[54] PRECOMBUSTION CHAMBER CONSTRUCTION FOR INTERNAL COMBUSTION ENGINE

[75] Inventors: Yasuhiro Miyakawa; Minoru Machida, both of Nagoya, Japan

[73] Assignee: NGK Insulators, Ltd., Nagoya, Japan

[21] Appl. No.: 245,724

[22] Filed: Sep. 19, 1988

[30] Foreign Application Priority Data

Sep. 24, 1987 [JP] Japan ................................ 62-144417

[51] Int. Cl.$^4$ ............................................. F02B 19/12
[52] U.S. Cl. ..................................... 123/270; 123/254
[58] Field of Search ............... 123/254, 255, 270, 271, 123/273, 275

[56] References Cited

U.S. PATENT DOCUMENTS

| | | | |
|---|---|---|---|
| 2,014,828 | 9/1935 | Wirrer | 123/275 X |
| 3,443,553 | 5/1969 | Yamada et al. | 123/273 X |
| 3,989,014 | 11/1976 | Brandstetter et al. | 123/275 |

FOREIGN PATENT DOCUMENTS 531075 12/1940 United Kingdom ............... 123/275

*Primary Examiner*—Tony M. Argenbright
*Attorney, Agent, or Firm*—Arnold, White & Durkee

[57] ABSTRACT

A precombustion chamber construction for an internal combustion engine comprises a precombustion chamber constructed by a ceramic body having a glow-plug receiving aperture to be inserted in a precombustion chamber receiving cavity of a metal cylinder head. A metal sleeve may be fitted on the ceramic body. A seat is formed at an entrance of a glow-plug receiving aperture on an outer circumferential surface of the metal sleeve, thereby preventing any leakage of burnt gases to ensure the complete thermal insulating effect. The metal sleeve is not necessarily needed. In this case, the seat is formed at an entrance of the glow-plug receiving aperture on an outer circumferential surface of the ceramic body.

2 Claims, 3 Drawing Sheets

PRECOMBUSTION CHAMBER CONSTRUCTION FOR INTERNAL COMBUSTION ENGINE

BACKGROUND OF THE INVENTION

This invention relates to a precombustion chamber construction for a diesel engine, and more particularly a precombustion chamber provided with a glow-plug in a side wall of a ceramic precombustion chamber.

Ceramic precombustion chambers superior in heat-resistant and thermal insulating properties have been practically used for diesel engines. A construction of a ceramic precombustion chamber provided with a glow-plug has been disclosed in Japanese Utility Model Application Publication No. 61-18,188 as shown in FIG. 1.

The known construction shown in FIG. 1 comprises thermal insulating spaces 3 in a side wall 7 of the ceramic precombustion chamber 4 and a glow-plug receiving aperture 10 formed in a glow-plug guide 14 of the side wall 7 and communicating with a glow-plug mounting threaded aperture 13 in a metal cylinder head 2.

In such a precombustion chamber for an internal combustion engine, the glow-plug is often provided on a side of a side wall of the ceramic precombustion chamber by reason of design. In this case, however, there is a clearance between the glow-plug and the glow plug receiving aperture, through which burned gases leak into the thermal insulating space to lower the thermal insulating effect. Moreover, actual compression ratios of the engine are changed to interfere with normal engine performance.

SUMMARY OF THE INVENTION

It is a primary object of the invention to provide a precombustion chamber for an internal combustion engine, which eliminates all the disadvantages of the prior art and comprises thermal insulating spaces for reliably insulating heat in the precombustion chamber with a simple construction even if a glow-plug is provided in a side wall of the precombustion chamber.

In order to achieve the object of the invention, a precombustion chamber construction for an internal combustion engine according to the invention comprises a precombustion chamber constructed by a ceramic body to be inserted in a precombustion chamber receiving cavity of a metal cylinder head, said ceramic body having a glow-plug receiving aperture, and a metal sleeve fitted on an outer circumference of the ceramic body, said metal sleeve having a glow-plug receiving aperture communicating with said glow-plug receiving aperture of said ceramic body and a glow-plug receiving aperture formed in a metal cylinder head, said metal sleeve having at an entrance of said glow-plug receiving aperture on an outer circumference surface a seat for fitting a glow-plug, and an inner circumferential surface of said precombustion chamber receiving cavity of the metal cylinder head and the outer circumferential surface of the metal sleeve forming thermal insulating spaces.

In a second aspect of the invention, a precombustion chamber construction for an internal combustion engine comprises a precombustion chamber constructed by a ceramic body to be inserted in a precombustion chamber receiving cavity of a metal cylinder head, said ceramic body having a glow-plug receiving aperture communicating with a glow-plug receiving aperture formed in the metal cylinder head, said ceramic body having on an outer circumferential surface at an entrance of said glow-plug receiving aperture a seat for fitting a glow-plug, and an inner circumferential surface of said precombustion chamber receiving cavity of the metal cylinder head and the outer circumferential surface of said ceramic body forming thermal insulating spaces with the aid of said projections of said ceramic body.

The precombustion chamber construction for the internal combustion engine according to the invention comprises the ceramic precombustion chamber having on the outer circumference the seat on which a glow-plug is fitted in an air-tight manner. With the glow-plug being inserted in the glow-plug receiving aperture, therefore, any leakage of burnt gases is prevented to ensure the complete thermal insulating effect and to obtain the steady engine performance. According to the invention, the above effect can be accomplished by simple change of design of the prior art cylinder head or ceramic precombustion chamber without lowering engine performance.

The invention will be more fully understood by referring to the following detailed specification and claims taken in connection with the appended drawings.

DESCRIPTION OF THE PREFERRED EMBODIMENTS

Figure 1:
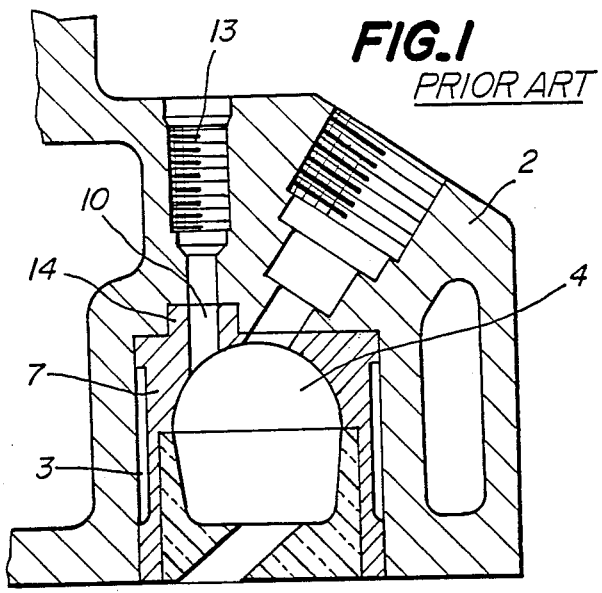
FIG. 1 is a sectional view of a precombustion chamber for an internal combustion engine of the prior art.
Figure 2:
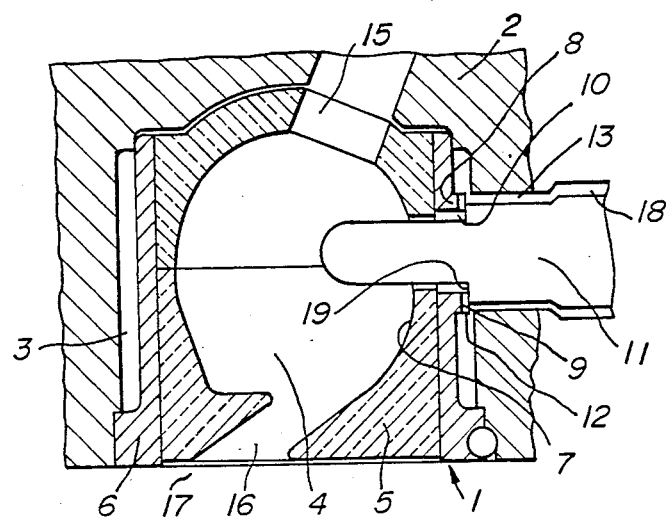
FIG. 2 is a sectional view of one embodiment of a precombustion chamber construction for an internal combustion engine according to the invention.
Figure 3:
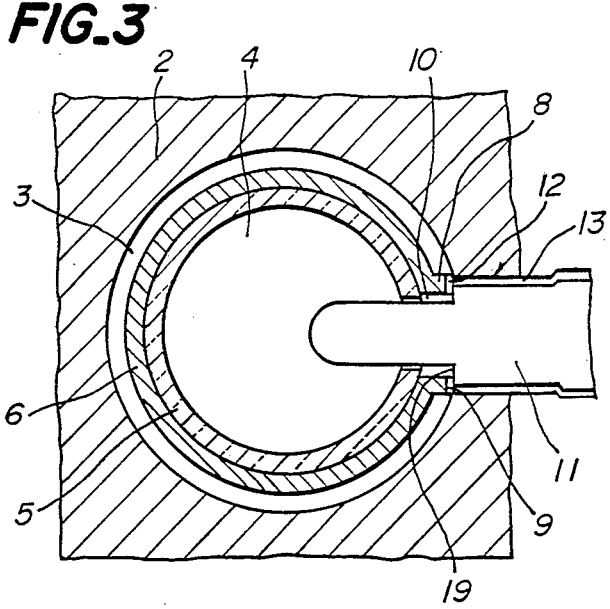
FIG. 3 is a cross-sectional view of the precombustion chamber construction shown in FIG. 2.

Referring to FIGS. 2 and 3 illustrating a first embodiment of the invention, a precombustion chamber construction 1 for an internal combustion engine comprises a ceramic precombustion chamber 4 received in a metal cylinder head 2. The ceramic precombustion chamber 4 is formed by a ceramic precombustion chamber member 5 fitted in a metal sleeve 6 by means of thermal shrinkage fit. An outer circumferential surface of the metal sleeve 6 and an inner circumferential surface of the metal cylinder head 2 form thermal insulating spaces 3.

A fuel injection nozzle receiving aperture 15 is formed in an upper wall of the ceramic precombustion chamber 4. An injection aperture 16 is formed in a lower wall of the ceramic precombustion chamber 4 on a side of a main combustion chamber 17. A side wall 7 of the ceramic precombustion chamber 4 is formed with a glow-plug receiving aperture 10 which extends through the ceramic precombustion chamber member 5 and the metal sleeve 6.

The metal sleeve 6 is formed on an outer circumference with a projection 8 in which the glow-plug receiving aperture 10 is formed.

The projection 8 is formed on its tip end with a seat 9 on which a glow-plug 11 is provided through a packing 12 made of a heat-resistant material such as a stainless steel in an air-tight manner. A height of the projection 8 or a distance from the inner surface of the ceramic precombustion chamber 4 to the seat 9 may be within a clearance of the thermal insulating spaces 3, for example, of the order of 1-2 mm when the ceramic precombustion chamber 4 is press-fitted into the metal cylinder head 2. The seat 9 may be a tangential plane to the outer circumferential surface of the metal cylinder head 2.

An outer shape of the seat 9 is determined so as to have an area sufficient to support the packing 12 having a diameter smaller than an inner diameter of a glow-plug receiving aperture 13 formed n the metal cylinder head 2. For example, in case of a glow-plug whose heating portion has an outer diameter of 8 mm, an inner diameter of the glow-plug receiving aperture 10 is 9 mm, an inner diameter of the glow-plug receiving aperture 13 formed in the metal cylinder head 2 is 14 mm, an outer diameter of the packing 12 is 13 mm and an outer diameter of the seat 9 is more than 13 mm.

The glow-plug 11 is formed on its outer circumferences with fitting screw threads 18 and a sealing portion 19. The fitting screw threads 18 are threadedly engaged in the glow-plug receiving aperture 13 formed in the metal cylinder head 2. When the glow-plug 11 is screwed into the glow-plug receiving aperture 13, the sealing portion 19 presses the packing 12 against the seat 9 of the projection 8 to keep the ceramic precombustion chamber in an air-tight manner. A heating portion of the glow-plug 11 is located at a center of the ceramic precombustion chamber 4.

Figure 4:
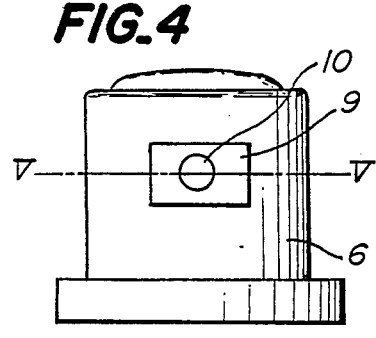
FIG. 4 is a front view of another embodiment of the ceramic precombustion chamber construction according to the invention.
Figure 5:
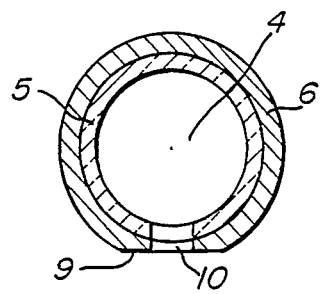
FIG. 5 is a cross-sectional view of the precombustion chamber taken along the line V—V in FIG. 4.

FIGS. 4 and 5 illustrate another embodiment of the invention, wherein a seat 9 including a glow-plug receiving aperture 10 is formed by flat cutting a part of an outer circumference of a metal sleeve 6 fitted on a ceramic precombustion chamber member forming a precombustion chamber 4. This embodiment has an advantage in that the seat 9 is easily formed on the metal sleeve 6.

Figure 6:
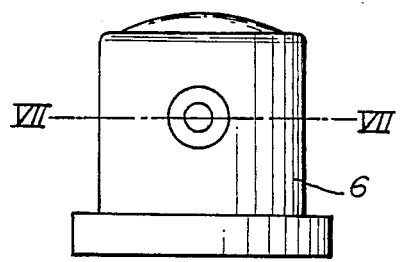
FIG. 6 is a front view of a further embodiment of the ceramic precombustion chamber construction according to the invention.
Figure 7:
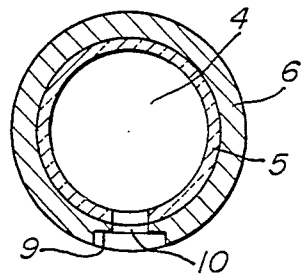
FIG. 7 is a cross-sectional view of the ceramic precombustion chamber construction taken along the line VII—VII in FIG. 6.

FIGS. 6 and 7 illustrate a further embodiment of the invention, wherein a seat 9 including a glow-plug receiving aperture 10 is formed inside a metal sleeve 6. This embodiment has an advantage in that a packing (not shown) 12 is easily positioned relative to the metal sleeve 6.

Figure 8:
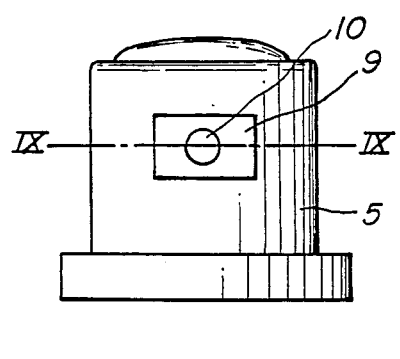
FIG. 8 is a front view of a ceramic precombustion chamber construction of a modified embodiment of the invention.
Figure 9:
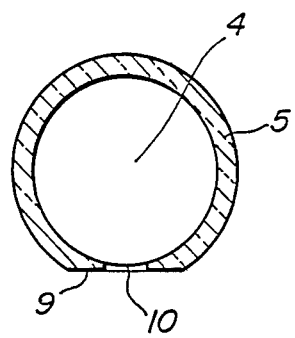
FIG. 9 is a cross-sectional view of the ceramic precombustion chamber construction taken along the line IX—IX in FIG. 8.
Figure 10:
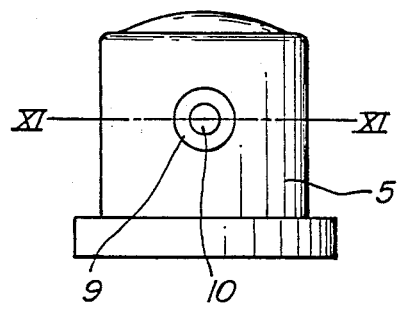
FIG. 10 is a front view of a ceramic precombustion chamber construction of another embodiment of the invention.
Figure 11:
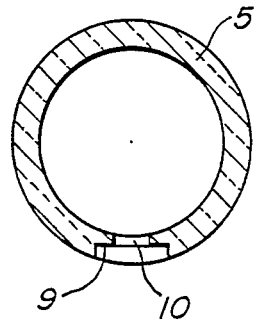
FIG. 11 is a cross-sectional view of the ceramic precombustion chamber construction taken along the line XI—XI in FIG. 10.

In the embodiments shown in FIGS. 1-6, the ceramic precombustion chamber 4 is constructed by the ceramic precombustion chamber member 5 and the metal sleeve 6. However, the ceramic precombustion chamber 4 may be formed only by a ceramic precombustion chamber member 5 which may be directly formed with a seat 9 as shown in FIGS. 8 and 9 and FIGS. 10 and 11. In FIGS. 8 and 9, the seat 9 is formed by flat cutting a part of an outer circumference of a ceramic precombustion chamber member 5. In FIGS. 10 and 11, the seat 9 is formed inside a ceramic precombustion chamber member 5. Moreover, the present invention may be applicable to a ceramic precombustion chamber formed by upper and lower precombustion chambers or integrally formed ceramic precombustion chamber.

As can be seen from the above explanation, the precombustion chamber construction for the internal combustion engine according to the invention comprises the ceramic precombustion chamber having on the outer circumference the seat on which a glow-plug is fitted in an air-tight manner. With the glow-plug being inserted in the glow-plug receiving aperture, therefore, any leakage of burnt gases is prevented to ensure the complete thermal insulating effect and to obtain the steady engine performance.

While the invention has been particularly shown and described with reference to preferred embodiments thereof, it will be understood by those skilled in the art that the foregoing and other changes is form and details can be made therein without departing from the spirit and scope of the invention.

What is claimed is:

1. A precombustion chamber construction for an internal combustion engine, comprising a precombustion chamber constructed by a ceramic body to be inserted in a precombustion chamber receiving cavity of a metal cylinder head, said ceramic body having a glow-plug receiving aperture, and a metal sleeve fitted on an outer circumference of the ceramic body, said metal sleeve having a glow-plug receiving aperture communicating with said glow-plug receiving aperture of said ceramic body and a glow-plug receiving aperture formed in a metal cylinder head, said metal sleeve having at an entrance of said glow-plug receiving aperture on an outer circumferential surface a seat for fitting a glow-plug, and an inner circumferential surface of said precombustion chamber receiving cavity of the metal cylinder head and the outer circumferential surface of the metal sleeve forming thermal insulating spaces.

2. A precombustion chamber construction for an internal combustion engine, comprising a precombustion chamber constructed by a ceramic body to be inserted in a precombustion chamber receiving cavity of a metal cylinder head, said ceramic body having a glow-plug receiving aperture communicating with a glow-plug receiving aperture formed in the metal cylinder head, said ceramic body having on an outer circumferential surface at an entrance of said glow-plug receiving aperture a seat for fitting a glow-plug, and an inner circumferential surface of said precombustion chamber receiving cavity of the metal cylinder head and the outer circumferential surface of said ceramic body forming thermal insulating spaces.

* * * * *